Feb. 4, 1936.      A. M. BUSWELL ET AL      2,029,702
PROCESS FOR THE DIGESTION OF INDUSTRIAL WASTES
Filed Jan. 23, 1932
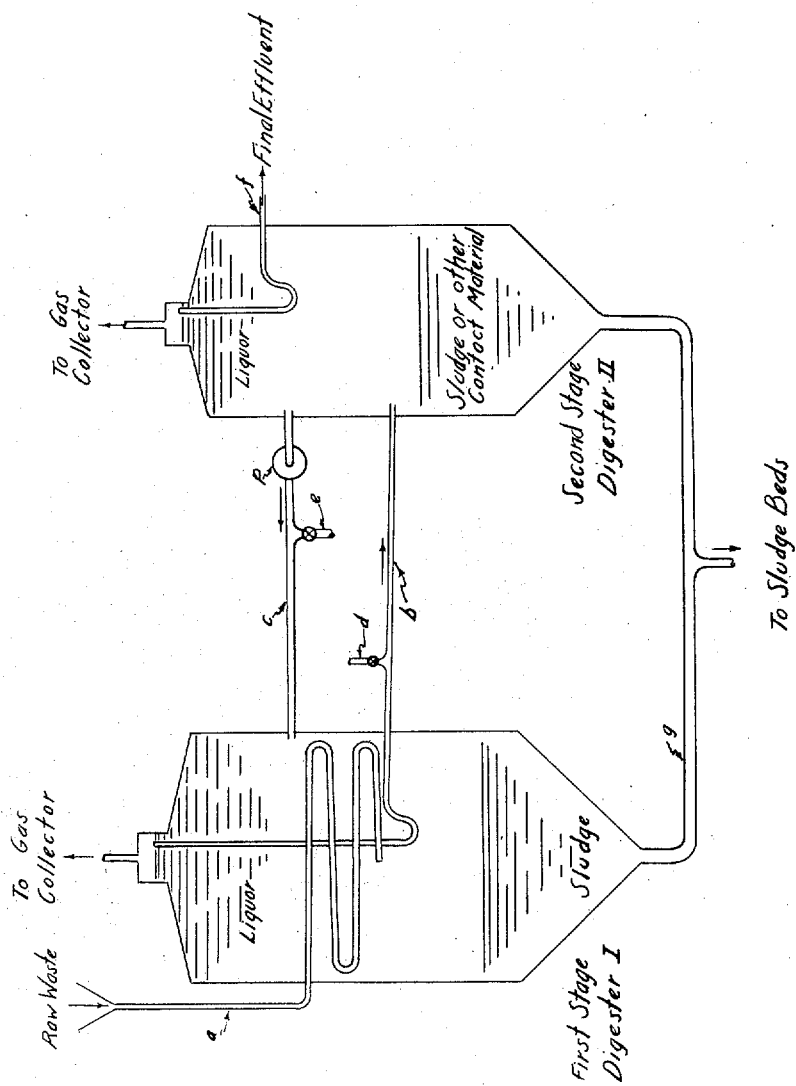

Patented Feb. 4, 1936

2,029,702

UNITED STATES PATENT OFFICE 2,029,702

PROCESS FOR THE DIGESTION OF INDUSTRIAL WASTES

Arthur M. Buswell and Clair S. Boruff, Urbana, Ill.

Application January 23, 1932, Serial No. 588,490

3 Claims. (Cl. 210—2)

The present invention relates to a process for treating strong organic wastes such as the industrial waste liquors from distilleries, breweries, starch works, creameries, canneries, factories, and the like. More specifically, the present invention relates to the process for obtaining valuable gaseous products from distillery and other wastes by anaerobic digestion.

In the past, serious difficulties have been encountered in disposing of the large amounts of industrial waste liquors. That the disposal of these wastes presents a serious problem may readily be seen from the fact that a single distillery producing solvents by the butyl-acetonic fermentation, produces distillery slop equivalent in quantity, solid matter, and B. O. D. (biological oxygen demand), to the domestic sewage of a city having a population of a million. Likewise the wastes from a single creamery in a town of 1500 may contribute 10 to 15 times the organic load from all other sources. The permanganate oxygen demand of undiluted skim milk, whey and buttermilk waste is from 200 to 400 times that of normal sewage. When diluted with the normal amount of wash and condenser waters it is usually about 25 times as strong as sewage.

Various methods have been proposed for treating such wastes, but up to the present time, none of these have been found economical.

In summary, the prior art indicates that distillery, creamery, and similar wastes containing a high concentration of soluble organic material cannot be fermented anaerobically without previously being highly diluted. Of course, it will be understood by those skilled in the art that the term "soluble organic material" and similar terms used herein and in the appended claims, refer to material in colloidal solution as well as in true solution.

The surprising discovery has now been made that if the rate of feeding and the detention period are regulated according to the principles to be hereafter described, and especially if the digestion is carried out by means of thermophilic bacteria, extremely active digestion of undiluted strong organic wastes may be obtained. By following the process to be hereafter described the difficulties previously encountered in the digestion of strong organic wastes, particularly undue acid formation, are eliminated and large yields of valuable fuel gas (methane and carbon dioxide) are obtained. According to this process, both the suspended and dissolved organic matter are digested and there is obtained a stabilized sludge and an effluent sufficiently stable to be run to the sewer without danger of overloading the treatment works. That the digestion of the dissolved organic matter in the present process constitutes a marked advantage over the prior art processes may readily be seen from the fact that in certain industrial wastes such as creamery wastes, from 90 to 95% of the organic matter is in true solution. Further advantage of the present invention will be seen from the following description.

The present process is essentially an anaerobic digestion similar to the well known treatment of sewage in septic tanks, the outstanding differences being the adjusted rate of feeding which is employed, the recirculation to prevent acid accumulation, and the high rates of digestion and gas production secured. According to this process, rates of gas prod ction are possible which are many times the rates previously obtained, even in the thermophilic digestion of domestic sewage. According to the present process, as much as seven liters of gas per liter of tank volume per day may be produced, in contrast with the maximum rate of gas production of only 1.2 liters reported by Heukelekian and Rudolfs (Sewage Works J., 3, 3, 1931) for the thermophilic digestion of sewage solids.

The process may be carried out in any of the well known types of anaerobic digestion apparatus such as the septic tanks or other tanks previously used for sewage sludge digestion. A suitable tank for this purpose is a vertical flow tank comprising a concrete tank with sloping bottom in which the inflow pipe forms a heating coil which discharges the raw waste some distance below the surface but not low enough to disturb the settled sludge by the current of inflowing liquid. Such a tank may be fitted with suitable means for removing sludge and effluent and means for collecting the gas given off during the digestion.

In starting operation a suitable inoculum of anaerobic organisms, of the type which form, as final products, gas but substantially little acid, must first be placed in the tank. These organisms may be obtained from any of the known sources of such organisms and pure cultures may be used if desired. However, it is preferred to use the following convenient method for building up the desired inoculum.

For example when not industrial wastes such as distillery wastes or creamery wastes are to be utilized and the digestion is to be effected by means of thermophilic bacteria, the inoculum may be built up as follows: Digesting sewage sludge or other suitable starting material is added to a tank filled with sewage or other liquor which is maintained at a temperature of 51–53° C. This tank is fed from time to time with raw sewage, sewage sludge, or other suitable material. After decomposition is established, the rate of feeding is regulated in accordance with the rate of gas formation and acid accumulation, and the digestion is continued with constant feeding until rapid digestion is established. At the end of this period, distillery slop, creamery waste, or whatever material is to be digested is fed instead of sewage, or the contents of the tank may be used to inoculate other digestion tanks to which the waste is to be fed.

Since the temperature of industrial wastes such as distillery wastes is above that at which the fermentation is to be carried out (for example, the temperature of butyl-acetonic slop is found to be 90-95° C.), temperature control of the fermentation is seen to be easily accomplished. The slop may be cooled by any known means, for example, in a double pipe cooler, to a temperature which, depending upon the rate of feed being employed and upon the temperature of the surrounding atmosphere, will maintain the contents of the digestion tank at 51-53° C.

The optimum detention period will depend upon the degree of digestion desired, the solid content of the waste, and the rate of gas production desired. For example, when using butyl-acetonic slop containing 25-40 grams of solid per liter, it is preferred to employ detention periods from approximately two days to approximately six days.

In most cases from 1 to 20 days will be found to be a satisfactory detention period and where thermophilic digestion is employed from 1 to 10 days will be found to be eminently suitable. In any case, the optimum rate of feeding or the optimum detention period for a particular waste and for the particular purpose of its treatment may readily be determined by one skilled in the art.

The invention may best be illustrated by the following specific examples. In all of these examples the inocula for the digestions were prepared from raw sewage and sludge as described above. The butyl-acetonic slop utilized in Example I had the approximate composition illustrated in Table I.

TABLE I

Analysis of butyl-acetonic slop

| | |
|---|---|
| pH | 4.5 to 5.3. |
| Total solids, grams per liter | 28 to 40. |
| Volatile matter, grams per liter | 26 to 36. |
| Volatile acids (as acetic) grams per liter | 1.8 to 2.4. |
| Ammonia nitrogen, milligrams per liter | 14 to 86. |
| Total nitrogen, milligrams per liter | 1,400 to 1,900. |
| B. O. D., 5-day, milligrams per liter | 17,000. |
| Oxygen consumed, milligrams per liter | 10,000 to 20,000. |
| Temperatures of waste as drawn | 90 to 95° C. |

Per cent of total solids

| | |
|---|---|
| Ash | 10 |
| Protein (Org. N.×6.25) | 32 |
| Fats and oils | 8 |
| Total carbohydrates (less cellulose) as glucose | 21 |
| Undetermined (crude fiber, etc.) | 29 |

Example I

Butyl-acetonic slop was digested at a temperature of 50-55° C. over a period of seven months utilizing average rates of feeding of one-half, one-fourth and one-sixth of the tank volume per day, i. e., detention periods of two, four, and six days respectively. The gas production data for this series of digestions are reported in Table II and the sanitary data are reported in Table III.

TABLE II

Gas production data

| Detention period | Yield of gas (No. of vols. per tank vol. per day) | Analysis of gas [1] | | |
|---|---|---|---|---|
| | | CH$_4$ per cent | CO$_2$ per cent | B. t. u. |
| 2 days | 7.0 | 55 | 43 | 500 |
| 3 days | 5.2 | | | |
| 4 days | 4.2 | 58 | 40 | 580 |
| 6 days | 3.0 | 58 | 40 | 580 |

[1] Contains 0.1 to 0.5 percent H$_2$ and 1.0 to 3.0 per cent N$_2$.

TABLE III

Sanitary data [1]

| | Original beer-slop waste | From tank 2 times volume of waste (2-day capacity) | | From tank 4 times volume of waste (4-day capacity) | | From tank 6 times volume of waste (6-day capacity) | |
|---|---|---|---|---|---|---|---|
| | | Percent of organic matter gasified 58 | | Percent of organic matter gasified 67 | | Percent of organic matter gasified 72 | |
| | | Sludge | Liquor | Sludge | Liquor | Sludge | Liquor |
| pH | 5.0 | 8.0 | 7.5 | 7.9 | 7.8 | 8.2 | 8.0 |
| Total solids, mg. per liter | 33,000 | 45,000 | 5,000 | 40,000 | 4,000 | 35,000 | 4,000 |
| Total volatile solids, mg. per liter | 30,000 | 39,000 | 4,200 | 33,000 | 3,600 | 28,000 | 3,200 |
| Settleable solids, mg. per liter | | | 650 | | 255 | | 200 |
| Volatile acids, as acetic, mg. per liter | 2,000 | 2,000 | 2,000 | 1,000 | 1,600 | 300 | 500 |
| Ammonia nitrogen, mg. per liter | 50 | 650 | 650 | 650 | 600 | 750 | 600 |
| Total nitrogen, mg. per liter | 1,600 | 3,000 | 1,000 | 3,000 | 1,000 | 3,000 | 850 |
| Oxygen consumed, mg. per liter | 16,000 | 10,000 | 3,000 | | 1,300 | | 1,000 |
| Immediate (30-min.) O$_2$ demand, mg. per liter | | | 12 | | 15 | | 23 |
| B. O. D., 5-day mg. per liter | 17,000 | 7,900 | 5,700 | 4,600 | 3,700 | 3,200 | 3,000 |
| B. O. D., 1-day mg. per liter | 6,000 | 2,400 | 1,800 | 1,500 | 1,500 | 1,000 | 1,000 |
| 1-day B. O. D., mg. of O$_2$ per liter per percent of volatile matter | 2,000 | 615 | | 454 | | 357 | |
| cc. gas per gm. volatile matter in 24 hrs | | 44 | | 28 | | | |
| cc. gas per gm. volatile matter in 10 days | | 148 | | 83 | | | |
| Percent moisture of sludge after draining 8 hours | | 70 | | 80 | | 84 | |
| Percent of sludge after drying 3 days | | 51 | | | | 66 | |
| Odor as drawn | | Bad | | Moderate | | Slight | |
| Odor after 3 days | | Moderate | | Slight | | Humus | |
| Volumes of sludge drawn per 100 volumes of waste fed | | 23 | | 22 | | 21 | |

[1] Average representative analysis.

Example II

An equal mixture of undiluted buttermilk and whey waste was digested at a temperature of 24–27° C. for a period of 30 days utilizing two digestion vessels through which the waste was fed in series. The average rate of feeding employed was one-twentieth the volume of the first digestion vessel per day. The data for this digestion are reported in Table IV.

TABLE IV

*The anaerobic-mesophilic fermentation of creamery waste (24–27° C.)*

| Time—days | Waste fed per day | | Tank N1 (10 liters vol.) | | | | Tank N2 (3.5 liters vol.) | | | |
|---|---|---|---|---|---|---|---|---|---|---|
| | | | Average gas per day | | | | Average gas per day | | | |
| | | | | | Analysis | | | | Analysis | |
| | c. c. | Grams | Volume, liters | Weight, grams | $CO_2$ (percent) | $CH_4$ (percent) | Volume, liters | Weight, grams | $CO_2$ (percent) | $CH_4$ (percent) |
| 30 | 500 | 35 | 20 | 23.6 | 40 | 55 | 1.0 | 1.1 | 35 | 60 |

It is known that attempts have been made to ferment distillery wastes with thermophilic microorganisms for the production of volatile acids. However, such processes are contrary to the purpose of the present invention, and an integral part of the present invention comprises a method for preventing the accumulating of substantial amounts of volatile acids.

It has been found that at times, especially when a tank is first put into operation using an industrial waste instead of sewage, there is a tendency for the free and combined volatile acids to increase to three or four parts per thousand (calculated as acetic in accordance with the procedure described on page 30 of Bulletin 29 of the Illinois State Water Survey, published May 1930). In such concentrations the buffer capacity of the liquid may be over-taxed and the pH may fall as low as 6.0. Addition of lime or other alkaline neutralizing agent will succeed in raising the pH, but the acid content remains high and in some cases is actually increased. Reducing the rate of feed and keeping the tank well mixed will be found to aid in bringing the tank back to normal operation.

Also, if all or a part of the overflow liquor from an active tank is passed through a second tank which contains some contact material such as asbestos fiber inoculated with the proper bacteria, or ripe anaerobic sludge, the acids which may be present in the liquor are readily converted to gas (methane and carbon dioxide). In such a procedure, if the first tank starts to develop an abnormal fermentation or the acids increase above three parts per thousand, due to too rapid feeding or otherwise, some of the liquor from the second tank is recycled back through the first tank. A more rapid gasification in the first tank results and the acids are reduced much more than can be accounted for by mere dilution.

An apparatus suitable for carrying out this improved procedure is illustrated diagrammatically in the accompanying drawing. The digester I is a conical bottom digester of the usual type fitted with a feed line a, an overflow line b, and a sludge line g. If the digestion is to be carried out by thermophilic bacteria and hot waste liquor is fed to the digester, the feed line a may form a heating coil as represented in the drawing. The digester with these fittings is suitable for carrying out the process of the present invention without acidity control as has been previously discussed. However, for the improved procedure in which acidity control is effected by liquor feed-back, a second digester II is used in conjunction with the first. This digester is partially filled with sludge or other contact material and the overflow line b of digester I feeds into the second digester at a point somewhat above the layer of contact material. A feed-back line c connects the two digesters at a point well above the ports of the feed lines and is fitted with a pump p suitable for forcing liquor from the second to the first digester. The second digester is fitted with an overflow line f for the final effluent and may be fitted with a sludge line g, although this is not necessary in all cases. Both digesters are fitted with gas collecting means of the usual type. The second digester may be considerably smaller than the first or it may serve as the second stage for more than one first stage digester. In the latter case, the lines b and c may be fitted with conjoining lines d and e connecting other first stage digesters.

The following procedure may be employed when carrying out the process with an apparatus of this type: After the inoculum has been built up in both digesters, as has previously been described, the process may be operated continuously by feeding the raw waste liquors at a and removing the final effluent at f. Sludge is periodically removed from the first digester through the line g and, if necessary, from the second digester through a similar line which may be connected to g. The total volatile acid content of the liquor in digester I is determined at frequent intervals, and, when it is found to exceed three parts per thousand, the pump p is started and liquor from digester II is recirculated through digester I until the acid content has again reached a normal value. During the entire process the gases from both digesters may be collected in the known manner.

It is to be distinctly understood that the above examples are merely illustrative and are not to be taken as limiting the scope of the present invention. For example, wastes other than those utilized in the examples may be employed, especially all strong organic wastes such as those from other fermentations, from starch works, canneries, factories, and the like. The process may also be modified in any way which would naturally occur to one skilled in the art. The invention is likewise not to be limited to any particular type of apparatus. For example, a number of small tanks in series may be used in place of a large tank as long as the required detention period is obtained. When extremely accurate control of the volatile acid content is desired it may be found preferable to use a plurality of tanks rather than the single second digestion tank mentioned above, and in such cases it may be found desirable to use different types of tanks in the same series. For example, if high rates of feed are employed and extremely high rates of gas production result, there may be such turbulence as to prevent sedimentation; and in such cases it may be desirable to use the special types of tanks, known to those skilled in the art, which are designed to obviate such difficulties.

The term "volatile acids" as used herein, designates total free and combined volatile acids as determined by the usual methods involving acidification with a mineral acid, distillation, and titration of the distillate. For example, the following is a suitable method for determining total volatile acids in the practice of the present invention. A sample of digesting waste is allowed to settle and 200 ml. of the supernatant liquid are measured into a distilling flask together with 5 ml. of concentrated sulfuric acid. The mixture is distilled at a constant rate and 150 ml. of distillate are collected in a receiver and titrated with N/10 NaOH. The total volatile acid content is calculated as acetic acid from the titration value, assuming a Duclaux recovery factor of 63% for the 150 ml. distillate.

The invention now having been described, what is claimed is:

1. In a process for the anaerobic bacterial digestion of fermentable liquid organic wastes having a non-settleable solid content substantially in excess of three parts by weight per thousand parts of total liquid waste by the action of methane-producing bacteria at hydrogen ion concentrations suitable for the methane-producing activity of said bacteria, the improvement which comprises maintaining the total free and combined volatile organic acid content of the liquid undergoing treatment below three parts by weight calculated as acetic acid per thousand parts by weight of said liquid.

2. In a process for the stabilization of fermentable liquid organic wastes having a non-settleable solid content substantially in excess of three parts by weight per thousand parts of total liquid waste by a continuous or semi-continuous process of anaerobic bacterial digestion by means of methane-producing bacteria at hydrogen ion concentrations suitable for the methane-producing activity of said bacteria, the improvement which comprises controlling the rate of feed of fresh waste to the digesting waste to maintain the total free and combined volatile organic acid content of the liquid undergoing treatment below three parts by weight calculated as acetic acid per thousand parts by weight of said liquid.

3. In a process for the stabilization of fermentable liquid organic wastes having a non-settleable solid content substantially in excess of three parts by weight per thousand parts of total liquid waste by a continuous or semi-continuous process of anaerobic bacterial digestion by means of methane-producing bacteria at hydrogen ion concentrations suitable for the methane-producing activity of said bacteria, the improvement which comprises effecting only partial digestion in a primary digestion vessel, continuing the digestion in at least one succeeding vessel and recycling digesting waste to a preceding vessel to maintain the total free and combined volatile organic acid content of the liquid in said preceding vessel below three parts by weight calculated as acetic acid per thousand parts by weight of said liquid.

ARTHUR M. BUSWELL.
CLAIR S. BORUFF.

---

CERTIFICATE OF CORRECTION.

Patent No. 2,029,702.            February 4, 1936.

ARTHUR M. BUSWELL, ET AL.

It is hereby certified that error appears in the printed specification of the above numbered patent requiring correction as follows: Page 1, second column, line 47, for "not" read hot; and that the said Letters Patent should be read with this correction therein that the same may conform to the record of the case in the Patent Office.

Signed and sealed this 17th day of March, A. D. 1936.

(Seal)                        Leslie Frazer
                                 Acting Commissioner of Patents.

control of the volatile acid content is desired it may be found preferable to use a plurality of tanks rather than the single second digestion tank mentioned above, and in such cases it may be found desirable to use different types of tanks in the same series. For example, if high rates of feed are employed and extremely high rates of gas production result, there may be such turbulence as to prevent sedimentation; and in such cases it may be desirable to use the special types of tanks, known to those skilled in the art, which are designed to obviate such difficulties.

The term "volatile acids" as used herein, designates total free and combined volatile acids as determined by the usual methods involving acidification with a mineral acid, distillation, and titration of the distillate. For example, the following is a suitable method for determining total volatile acids in the practice of the present invention. A sample of digesting waste is allowed to settle and 200 ml. of the supernatant liquid are measured into a distilling flask together with 5 ml. of concentrated sulfuric acid. The mixture is distilled at a constant rate and 150 ml. of distillate are collected in a receiver and titrated with N/10 NaOH. The total volatile acid content is calculated as acetic acid from the titration value, assuming a Duclaux recovery factor of 63% for the 150 ml. distillate.

The invention now having been described, what is claimed is:

1. In a process for the anaerobic bacterial digestion of fermentable liquid organic wastes having a non-settleable solid content substantially in excess of three parts by weight per thousand parts of total liquid waste by the action of methane-producing bacteria at hydrogen ion concentrations suitable for the methane-producing activity of said bacteria, the improvement which comprises maintaining the total free and combined volatile organic acid content of the liquid undergoing treatment below three parts by weight calculated as acetic acid per thousand parts by weight of said liquid.

2. In a process for the stabilization of fermentable liquid organic wastes having a non-settleable solid content substantially in excess of three parts by weight per thousand parts of total liquid waste by a continuous or semi-continuous process of anaerobic bacterial digestion by means of methane-producing bacteria at hydrogen ion concentrations suitable for the methane-producing activity of said bacteria, the improvement which comprises controlling the rate of feed of fresh waste to the digesting waste to maintain the total free and combined volatile organic acid content of the liquid undergoing treatment below three parts by weight calculated as acetic acid per thousand parts by weight of said liquid.

3. In a process for the stabilization of fermentable liquid organic wastes having a non-settleable solid content substantially in excess of three parts by weight per thousand parts of total liquid waste by a continuous or semi-continuous process of anaerobic bacterial digestion by means of methane-producing bacteria at hydrogen ion concentrations suitable for the methane-producing activity of said bacteria, the improvement which comprises effecting only partial digestion in a primary digestion vessel, continuing the digestion in at least one succeeding vessel and recycling digesting waste to a preceding vessel to maintain the total free and combined volatile organic acid content of the liquid in said preceding vessel below three parts by weight calculated as acetic acid per thousand parts by weight of said liquid.

ARTHUR M. BUSWELL.
CLAIR S. BORUFF.

---

CERTIFICATE OF CORRECTION.

Patent No. 2,029,702. February 4, 1936.

ARTHUR M. BUSWELL, ET AL.

It is hereby certified that error appears in the printed specification of the above numbered patent requiring correction as follows: Page 1, second column, line 47, for "not" read hot; and that the said Letters Patent should be read with this correction therein that the same may conform to the record of the case in the Patent Office.

Signed and sealed this 17th day of March, A. D. 1936.

(Seal)

Leslie Frazer
Acting Commissioner of Patents.